(12) United States Patent
Chamberlin et al.

(10) Patent No.: US 11,336,138 B2
(45) Date of Patent: May 17, 2022

(54) HYBRID ROTOR MODULE COOLING

(71) Applicant: BorgWarner Inc., Auburn Hills, MI (US)

(72) Inventors: Bradley Duane Chamberlin, Pendleton, IN (US); Sven Norbert Altlay, Friesenheim (DE); Jomon Kaniampalackal, Hockenheim (DE); Clemens Burger, Nobelsville, IN (US)

(73) Assignee: BORGWARNER INC., Auburn Hills, MI (US)

( * ) Notice: Subject to any disclaimer, the term of this patent is extended or adjusted under 35 U.S.C. 154(b) by 563 days.

(21) Appl. No.: 15/496,820

(22) Filed: Apr. 25, 2017

(65) Prior Publication Data

US 2017/0324290 A1 Nov. 9, 2017

Related U.S. Application Data

(60) Provisional application No. 62/333,516, filed on May 9, 2016.

(51) Int. Cl.
*H02K 1/32* (2006.01)
*H02K 9/19* (2006.01)
(Continued)

(52) U.S. Cl.
CPC ............. *H02K 1/32* (2013.01); *H02K 1/2706* (2013.01); *H02K 5/20* (2013.01); *H02K 7/006* (2013.01);
(Continued)

(58) Field of Classification Search
CPC .. H02K 1/32; H02K 9/19; H02K 1/20; H02K 1/2706; H02K 5/20; H02K 7/006; H02K 7/10; H02K 7/108; H02K 9/00; B60K 11/00; B60K 11/02; B60K 6/387; F16D 13/72; F16D 25/123
(Continued)

(56) References Cited

U.S. PATENT DOCUMENTS 4,926,105 A * 5/1990 Mischenko ............. H02P 21/06
318/800
6,371,267 B1 4/2002 Kao et al.
(Continued)

FOREIGN PATENT DOCUMENTS

CN 101656445 A 2/2010
JP 2009072052 A * 4/2009

OTHER PUBLICATIONS

JP-2009072052-A (English Translation) (Year: 2009).*
PCT/US2017/030775—ISR/WO, dated Aug. 11, 2017, 11 pages.

*Primary Examiner* — Quyen P Leung
*Assistant Examiner* — Alexander Moraza
(74) *Attorney, Agent, or Firm* — Cantor Colburn LLP

(57) ABSTRACT

An electric machine including a housing, and a stator mounted to the housing. The stator includes a plurality of laminations, a first end turn and a second end turn. A rotor shaft extends through the housing. A hybrid rotor module is coupled to the rotor shaft. The hybrid rotor module includes a clutch basket having a rotor carrier. The clutch basket houses one or more clutch assemblies. A rotor is mounted to the rotor carrier, and one or more openings are formed in the rotor carrier. The one or more openings direct coolant onto at least one of the stator, the first end turn, and the second end turn.

18 Claims, 3 Drawing Sheets

(51) Int. Cl.
  *H02K 7/10* (2006.01)
  *H02K 7/00* (2006.01)
  *H02K 7/108* (2006.01)
  *H02K 1/2706* (2022.01)
  *H02K 5/20* (2006.01)
  *H02K 21/14* (2006.01)

(52) U.S. Cl.
  CPC .............. *H02K 7/10* (2013.01); *H02K 7/108* (2013.01); *H02K 9/19* (2013.01); *H02K 21/14* (2013.01)

(58) Field of Classification Search
  USPC .............. 310/61, 156.53, 156.56; 192/113.3, 192/113.34, 70.12, 85.61
  See application file for complete search history.

(56) References Cited

U.S. PATENT DOCUMENTS

| | | | |
|---|---|---|---|
| 7,508,100 B2 * | 3/2009 | Foster | B60K 6/26 180/65.6 |
| 9,528,436 B2 | 12/2016 | Kasuya et al. | |
| 9,636,990 B2 | 5/2017 | Kasuya et al. | |
| 9,906,103 B2 | 2/2018 | Suzuki et al. | |
| 2005/0206248 A1 | 9/2005 | Raszkowski et al. | |
| 2009/0008212 A1 * | 1/2009 | Combes | B60K 6/387 192/113.34 |
| 2010/0261575 A1 | 10/2010 | Schoenek | |
| 2011/0138944 A1 * | 6/2011 | Mohlin | F16H 3/006 74/331 |
| 2011/0240384 A1 * | 10/2011 | Roske | B60K 6/38 180/65.22 |
| 2012/0075046 A1 * | 3/2012 | Hagiwara | C22C 38/14 335/302 |
| 2012/0080248 A1 * | 4/2012 | Kasuya | B60K 6/40 180/65.21 |
| 2013/0020889 A1 * | 1/2013 | Yamamoto | H02K 1/2766 310/59 |
| 2015/0027273 A1 * | 1/2015 | Iwase | B60K 6/387 74/665 B |
| 2016/0082825 A1 | 3/2016 | Ruder | |
| 2017/0197502 A1 | 7/2017 | Yukishima et al. | |

* cited by examiner

HYBRID ROTOR MODULE COOLING

CROSS-REFERENCE TO RELATED APPLICATIONS

The present application claims priority to U.S. Provisional Application No. 62/333,516, filed on May 9, 2016, the contents of which are incorporated herein by reference in their entirety.

BACKGROUND OF THE INVENTION

Exemplary embodiments pertain to the art of electric motors, and more particularly, to a cooling system for an electric motor having a hybrid rotor module.

During operation, electrical energy flow develops heat in rotor and stator portions of an electric motor. Hybrid electric motors may develop additional heat through operation of one or more clutches. Heat can reduce operational performance and an overall operational life of an electric machine. In order to reduce heat build up, coolant is typically passed through the electric motor. Coolant may take the form of a fluid such as air, water or oil.

BRIEF DESCRIPTION OF THE INVENTION

Disclosed is an electric machine including a housing, and a stator mounted to the housing. The stator includes a plurality of laminations, a first end turn and a second end turn. A rotor shaft extends through the housing. A hybrid rotor module is coupled to the rotor shaft. The hybrid rotor module includes a clutch basket having a rotor carrier. The clutch basket houses one or more clutch assemblies. A rotor is mounted to the rotor carrier, and one or more openings are formed in the rotor carrier. The one or more openings direct coolant onto at least one of the stator, the first end turn, and the second end turn.

Also disclosed is a method of cooling a hybrid rotor module of an electric machine including guiding an volume of coolant into a clutch basket of the hybrid rotor module, passing at least a portion of the volume of coolant to at least one clutch assembly arranged in the clutch basket, directing at least some of the portion of the volume of coolant through a rotor carrier of the clutch basket, and flinging the at least some of the portion of the volume of coolant onto at least one end turn of a stator of the electric machine.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
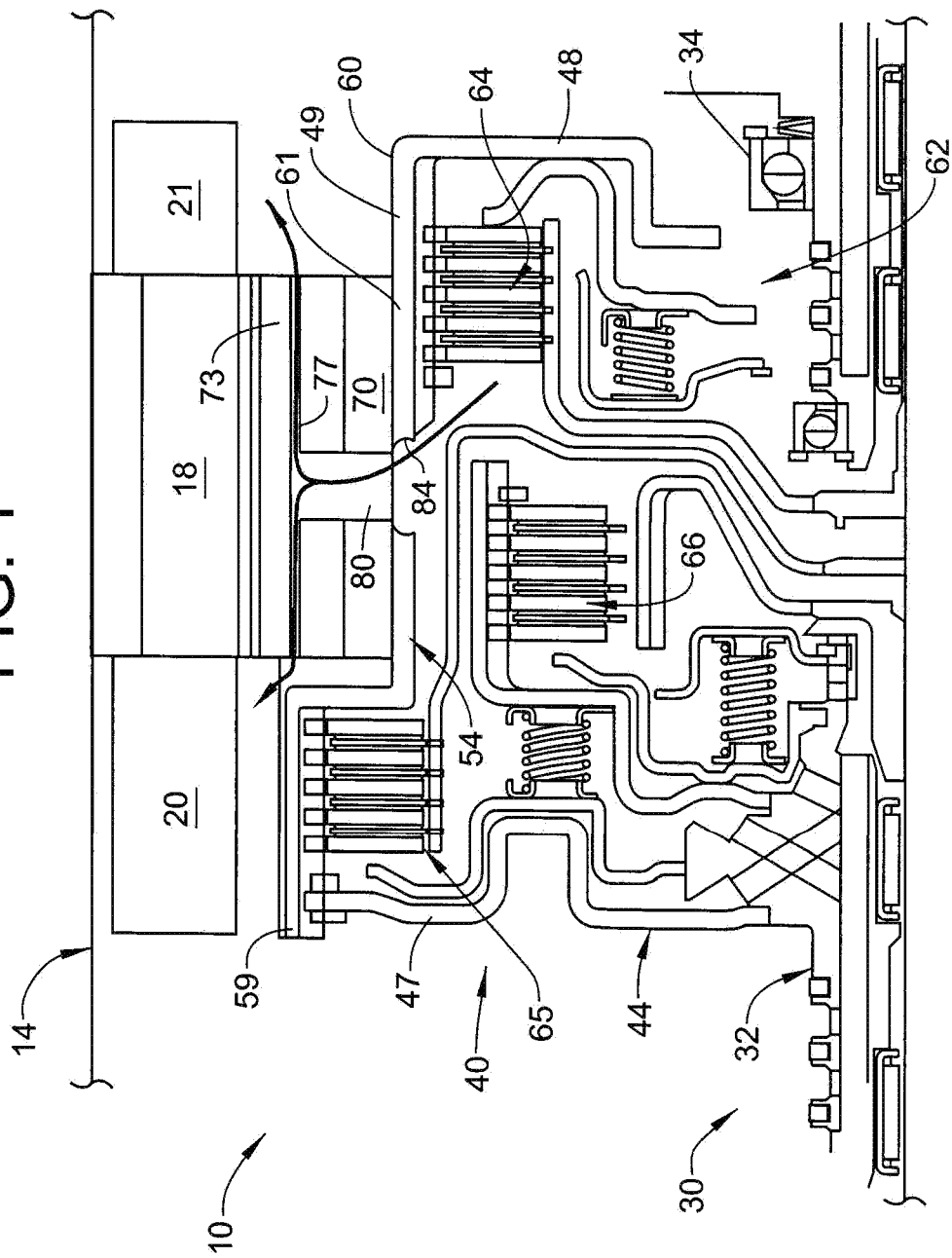
FIG. 1 depicts a portion of an electric machine having a hybrid rotor module, in accordance with an aspect of an exemplary embodiment.

An electric machine, in accordance with an aspect of an exemplary embodiment, is illustrated generally at 10 in FIG. 1. Electric machine 10 includes a housing 14 supporting a stator 18 having a first end turn 20 and a second end turn 21. It is to be understood that housing 14 may not directly support stator 18. For example, stator 18 could be supported by intermediate structure arranged within housing 14. A rotor shaft 30 extends through housing 14. Rotor shaft 30 includes an outer surface 32 and may be rotatably supported in housing 14 through a plurality of bearings, one of which is indicated at 34.

Electric machine 10 includes a hybrid rotor module 40 operatively coupled to rotor shaft 30. Hybrid rotor module 40 includes a clutch basket 44 defined by a first member 47, a second member 48 and a third member 49. It is to be understood that first, second and third members 47-49 may be individual components, multiple components, or may be formed as a unitary structure. First and second members 47 and 48 extend radially outwardly of outer surface 32 and are joined by third member 49. In this manner, third member 49 defines a rotor carrier 54. In the exemplary embodiment shown, rotor carrier 54 includes a first end 59, a second end 60, and an intermediate portion 61 extending therebetween. First end 59 is radially offset relative to second end 60.

First, second and third members 47-49 define an interior portion 62 housing a first clutch assembly 64, a second clutch assembly 65 and a third clutch assembly 66. First clutch assembly 64 may be operable to engage an internal combustion engine (not shown). Second and third clutch assemblies 65 and 66 may be operable to engage a dual clutch transmission. For example, second clutch assembly 65 may be associated with engaging a first gear set (not shown) and third clutch assembly 66 may be associated with engaging a second gear set (also not shown). Thus, in accordance with an exemplary aspect, electric machine 10 may form part of a hybrid electric drive system for a vehicle.

A rotor 70 is mounted to rotor carrier 54. Rotor 70 may include a plurality of laminations (not separately labeled) and is rotated relative to stator 18 to develop an electrical current. In the exemplary embodiment shown, rotor 70 may include a magnet 73. Magnet 73 may be positioned within rotor 70 so as to define an interior permanent magnet (IPM) rotor, or may be positioned radially outwardly of rotor 70 so as to define a surface permanent magnet (SPM) rotor. It is to be understood that rotor 70 may take the form of an aluminum induction rotor or a copper induction rotor. A coolant passage 77 may extend between rotor 70 and magnet 73. Coolant passage 77 is fluidically connected with a channel 80 extending radially through rotor 70. Channel 80 registers with an opening 84 formed in rotor carrier 54. Opening 84 fluidically connects interior portion 62 with coolant passage 77. It is to be understood that the number of openings 84, channels 80 and coolant passages 77 may vary. For example, a number of openings 84, channels 80 and coolant passages 77 may extend annularly about rotor 70 and rotor carrier 54.

A volume of coolant, such as oil, is passed into interior portion 62. A portion of the volume of coolant may pass over one or more of first, second and third clutch assemblies 64-66. Some of the coolant passing over the one or more of first, second and third clutch assemblies 64-66 and/or another portion of the volume of coolant passes through opening 84 into channel 80. The coolant flows through coolant passage 77 in a heat exchange relationship with rotor 70 and/or with magnet 73 if so provided. The coolant may then pass from coolant passage 77 via opposing outlets (not separately labeled) and is flung, by for example, centrifugal force, onto first end turn 20 and second end turn 21 providing additional cooling benefits. The coolant may then pass to a drain, through a heat exchanger, and then be redirected back into interior portion 62.

Figure 2:
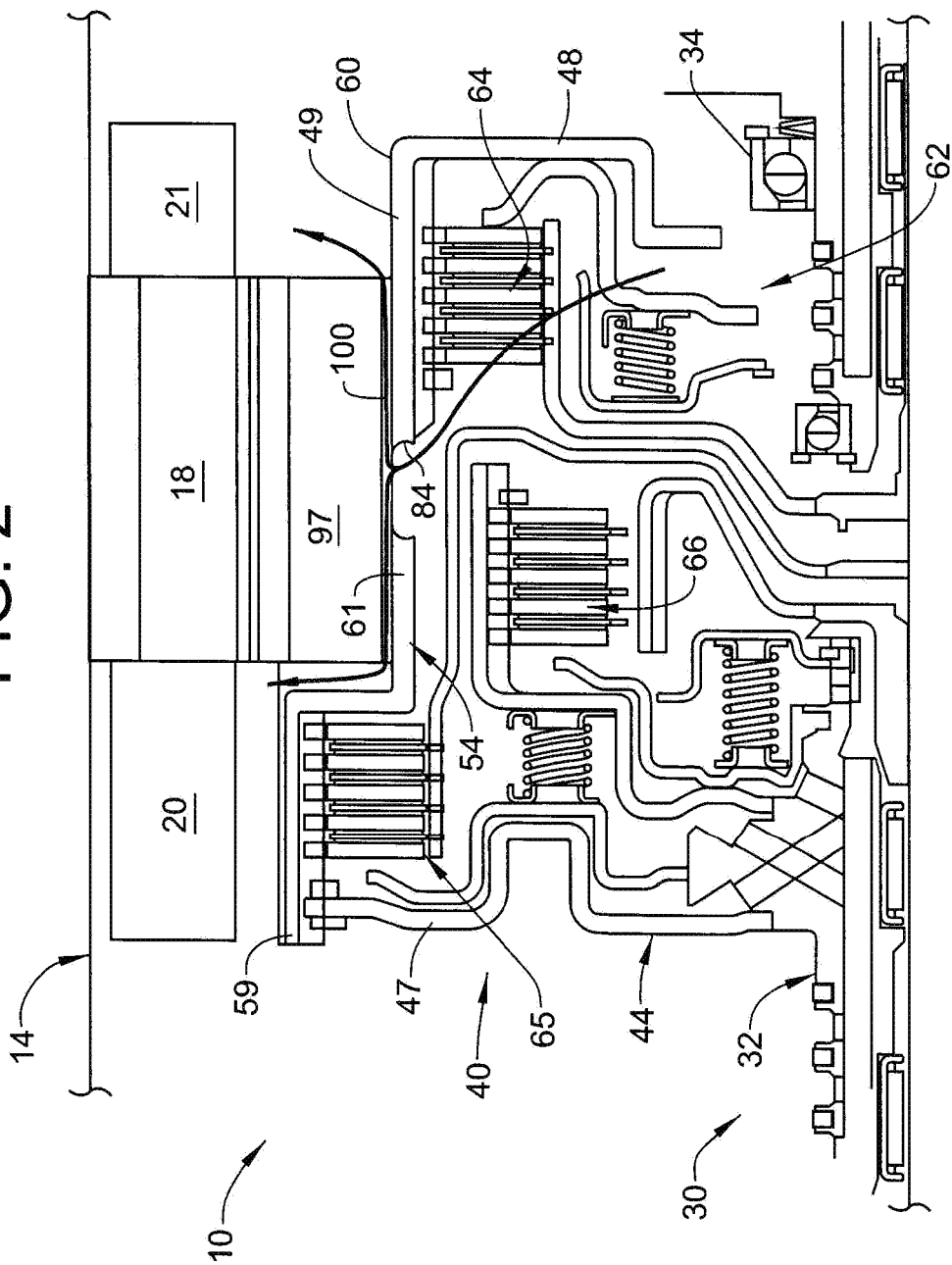
FIG. 2 depicts a portion of an electric machine having a hybrid rotor module, in accordance with another aspect of an exemplary embodiment.

Reference will now follow to FIG. 2, wherein like reference numbers represent corresponding parts in the respective views, in describing a rotor 97 in accordance with another aspect of an exemplary embodiment. Rotor 97 is coupled to rotor carrier 54. A coolant passage 100 extends axially between rotor 97 and rotor carrier 54. Coolant passage 100 is fluidically connected to interior portion 62 via opening 84. In this manner, coolant may flow from interior portion 62 into coolant passage 100 and pass, in a heat exchange relationship, through rotor 97. The coolant may then pass from coolant passage 100 via opposing outlets (not separately labeled) and be flung radially outwardly from coolant passage 100 onto first end turn 20 and second end turn 21 providing additional cooling benefits.

Figure 3:
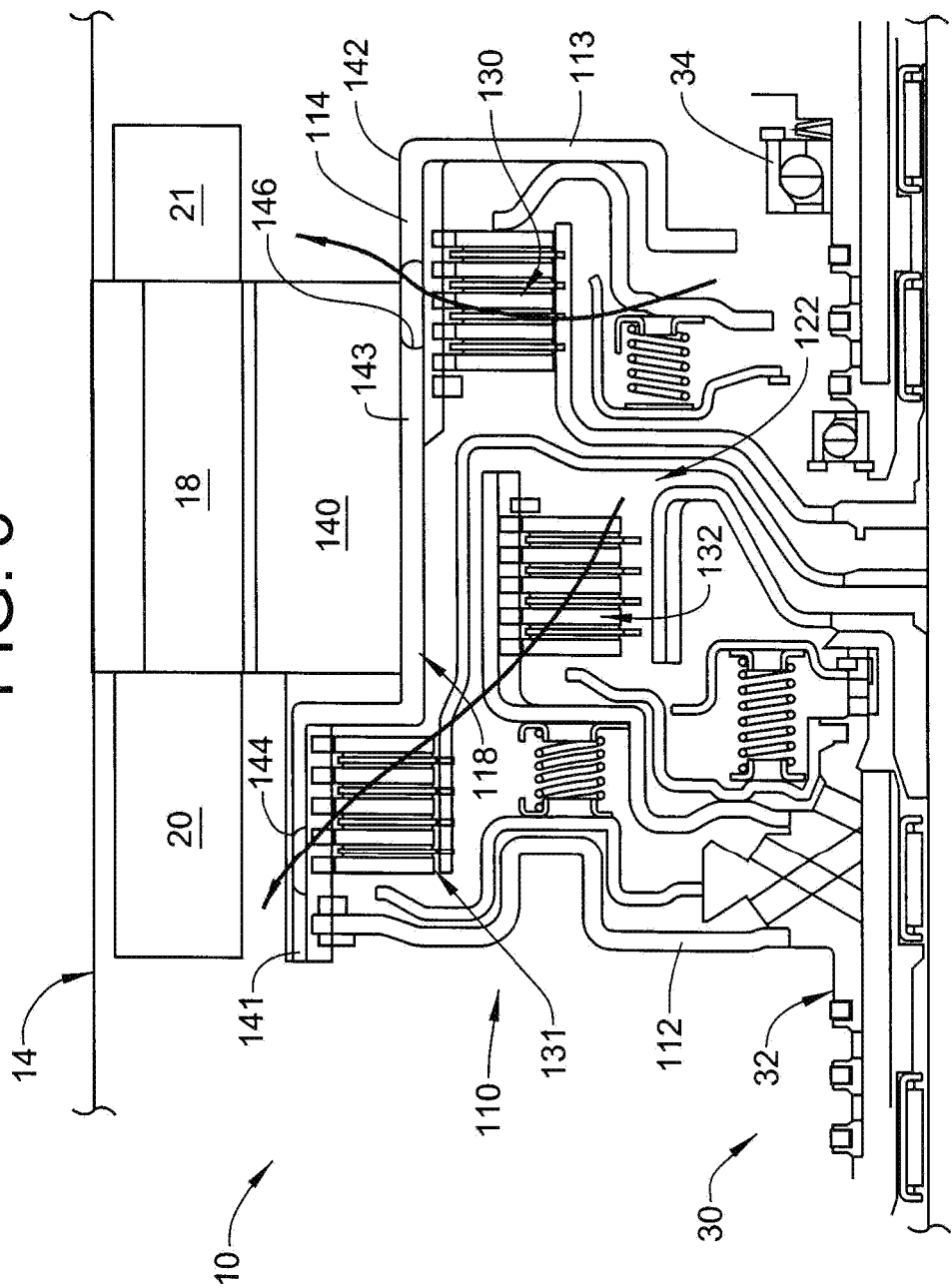
FIG. 3 depicts a portion of an electric machine having a hybrid rotor module, in accordance with yet another aspect of an exemplary embodiment.

Reference will now follow to FIG. 3, wherein like reference numbers represent corresponding parts in the respective views, in describing a clutch basket 110 in accordance with an aspect of an exemplary embodiment. Clutch basket 110 includes a first member 112, a second member 113 and a third member 114. It is to be understood that first, second and third members 112-114 may be individual components, multiple components, or may be formed as a unitary structure. First and second members 112 and 113 extend radially outwardly of outer surface 32 and are joined by third member 114. In this manner, third member 114 defines a rotor carrier 118.

First, second and third members 112-114 define an interior portion 122 housing a first clutch assembly 130, a second clutch assembly 131 and a third clutch assembly 132. First clutch assembly 130 may be operable to engage an internal combustion engine (not shown). Second and third clutch assemblies 131 and 132 may be operable to engage a dual clutch transmission. For example, second clutch assembly 131 may be associated with engaging a first gear set (not shown) and third clutch assembly 132 may be associated with engaging a second gear set (also not shown).

In accordance with an aspect of an exemplary embodiment, a rotor 140 is mounted to rotor carrier 118. Rotor 140 is rotated relative to stator 18 to develop an electrical current. In the exemplary embodiment shown, rotor carrier 118 includes a first end 141, a second end 142, and an intermediate portion 143 extending therebetween. First end 141 is radially offset relative to second end 142 and includes a first opening 144. Second end 142 includes a second opening 146. First opening 144 is arranged near second clutch assembly 131 and second opening 146 is arranged near first clutch assembly 130. It is to be understood that the location and number of openings formed in rotor carrier 118 may vary.

In this manner, a portion of the coolant flowing through interior portion 122 may pass over second clutch assembly 131, flow through first opening 144 axially outwardly of rotor 140 and be flung radially outwardly onto first end turn 20. Similarly, another portion of the coolant flowing through interior portion 122 may pass over first clutch assembly 130, flow through second opening 146 axially outwardly of rotor 140 and be flung radially outwardly onto second end turn 21. The coolant may also flow in a heat exchange relationship with rotor 140 prior to being distributed to stator 18 and/or first and second end turns 20 and/or 21.

It is to be understood that exemplary embodiments describe systems for proving cooling to components of an electric machine including a hybrid rotor module. Coolant is passed into the hybrid rotor module in a heat exchange relationship with one or more clutch assemblies. The coolant is then passed out from the hybrid rotor module and flung, radially outwardly, onto a stator and/or stator end turns to provide additional cooling benefits. The coolant may pass in a heat exchange relationship with a rotor prior to being distributed to the stator and/or stator end turns.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine comprising:
a housing;
a stator mounted to the housing, the stator including a plurality of laminations, a first end turn and a second end turn;
a rotor shaft extending through the housing;
a clutch basket including a rotor carrier connected to the rotor shaft, the rotor carrier including a first radially extending member and a second radially extending member, and a third radially extending member arranged between the first radially extending member and the second radially extending member, a rotor mounted to the rotor carrier between the second radially extending member and the third radially extending member, the clutch basket including an interior portion defined by the rotor carrier, the first radially extending member and the second radially extending member; the clutch basket including at least a first clutch assembly and a second clutch assembly;
one or more openings extending radially through the rotor carrier;
a coolant passage arranged between the rotor and the rotor carrier, the coolant passage fluidically connected to the interior portion through the one or more openings;
at least two outlets fluidly connected to the coolant passage, a first outlet of the at least two outlets directing a coolant flow radially outward from the rotor carrier between the rotor and the third radially extending member onto one of the first end turn and the second end turn and a second outlet of the at least two outlets directing the coolant flow axially outwardly from the rotor carrier onto another of the first end turn and the second end turn, wherein the one or more openings, the coolant passage, the first outlet, and the second outlet being configured to pass cooling through at least the first clutch assembly and the second clutch assembly, a portion of the coolant passes through the coolant passage in a first axial direction to the first outlet and another portion of the coolant passes through the coolant passage in a second axial direction opposite the first axial direction to the second outlet.

2. The electric machine according to claim 1, wherein the rotor includes at least one channel that registers with one of the one or more openings.

3. The electric machine according to claim 1, wherein the rotor carrier includes a first end, a second end, and an intermediate portion extending therebetween, the first clutch assembly being arranged at the first end and the second clutch assembly being arranged at the second end.

4. The electric machine according to claim 3, wherein the first end is radially outwardly offset relative to the second end.

5. The electric machine according to claim 3, further comprising: a third clutch assembly arranged in the interior portion.

6. The electric machine according to claim 1, wherein the coolant comprises oil.

7. The electric machine according to claim 1, further comprising a magnet arranged at the rotor.

8. The electric machine according to claim 7, wherein the rotor comprises one of an internal permanent magnet (IPM) rotor and a surface permanent magnet (SPM) rotor.

9. The electric machine according to claim 7, wherein the coolant passage is arranged between the magnet and the rotor.

10. The electric machine according to claim 1, wherein the rotor comprises one of an aluminum induction rotor and a copper induction rotor.

11. The electric machine according to claim 1, wherein the first radially extending member defines a first axial end of the rotor carrier and the second radially extending member defines a second axial end of the rotor carrier, the first axial end being radially offset relative to the second axial end through the third radially extending member.

12. A method of cooling a hybrid rotor module of an electric machine comprising:
    guiding a volume of coolant into an interior portion of a clutch basket of the hybrid rotor module;
    passing at least a portion of the volume of coolant to a first clutch assembly and a second clutch assembly arranged in the clutch basket;
    directing at least some of the portion of the volume of coolant through a rotor carrier of the clutch basket, the rotor carrier including a first radially extending member, a second radially extending member, and a third radially extending member arranged between the first radially extending member and the second radially extending member;
    directing the at least some of the portion of the volume of coolant from the interior portion into a coolant passage extending between the rotor carrier and a rotor of the electric machine arranged between the second radially extending member and the third radially extending member via one or more openings extending through the rotor carrier, a first amount of the at least some of the portion of the volume of coolant flowing in a first axial direction through the coolant passage and a second amount of the at least some of the portion of the volume of coolant flowing in a second axial direction opposite the first axial direction; and
    flinging the at least some of the portion of the volume of coolant through at least two outlets fluidically connected to the coolant passage, wherein fluid being flung from one of the at least two outlets flows radially outward from the rotor carrier between the third radially extending member and the rotor onto a first end turn of a stator of the electric machine, and fluid being flung from another of the at least two outlets flows axially outward from the rotor carrier onto a second end turn of the stator of the electric machine.

13. The method of claim 12, wherein directing the at least some of the volume of coolant through the rotor carrier includes passing the at least some of the volume of coolant through the rotor.

14. The method of claim 13, wherein passing the at least some of the volume of coolant through the rotor includes passing the at least some of the volume of coolant between the rotor and a magnet arranged at the rotor.

15. The method of claim 12, wherein directing the at least some of the volume of coolant through the rotor carrier includes passing the at least some of the volume of coolant between the rotor and the rotor carrier.

16. The method of claim 12, wherein passing the at least a portion of the volume of coolant to the first clutch assembly and the second clutch assembly includes directing a first portion of the volume of coolant to the first clutch assembly and a second portion of the volume of coolant to the second clutch assembly.

17. The method of claim 12, wherein flinging the at least some of the portion of the volume of coolant onto at least one of the first end turn and the second end turn, includes passing the at least some of the portion of the volume of coolant in a heat exchange relationship with the rotor.

18. The method of claim 12, wherein directing the at least some of the volume of coolant through the rotor carrier includes passing the at least some of the volume of coolant along a surface of the rotor mounted to the rotor carrier.

* * * * *